May 27, 1924.
A. C. DICKINSON
1,495,680
SAW CARRIAGE HEADBLOCK NUT
Filed July 3, 1922
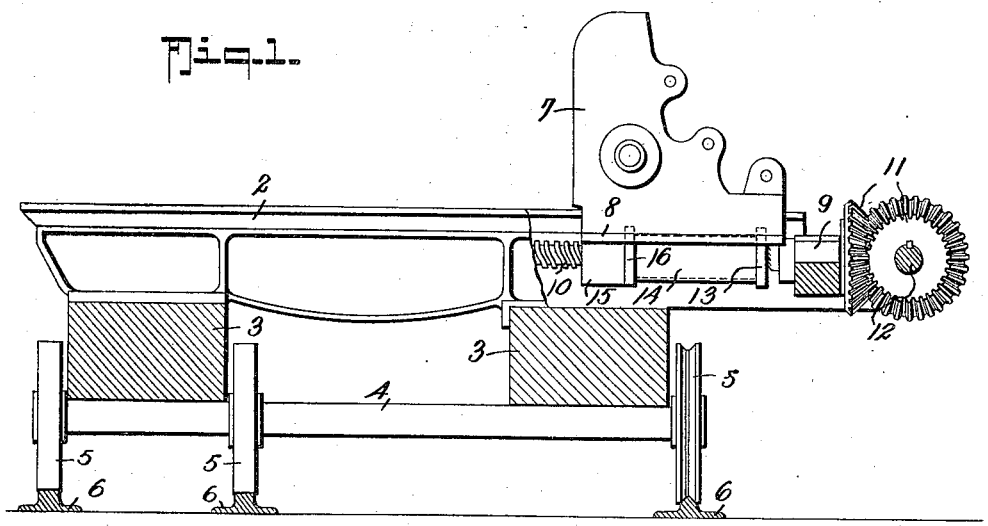
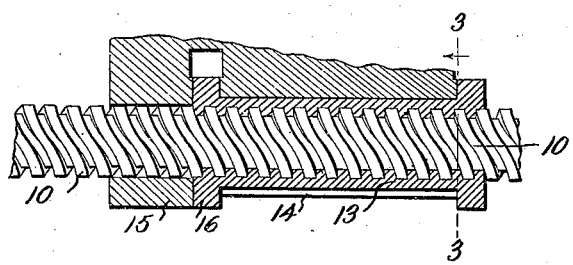
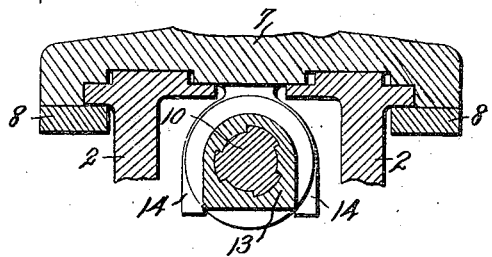
Inventor
Aaron C. Dickinson.
By Fred G. Dieterich
Attorneys Patented May 27, 1924.

1,495,680

UNITED STATES PATENT OFFICE.

AARON C. DICKINSON, OF FRASER MILLS, BRITISH COLUMBIA, CANADA.

SAW-CARRIAGE HEADBLOCK NUT.

Application filed July 3, 1922. Serial No. 572,610.

*To all whom it may concern:*

Be it known that I, AARON C. DICKINSON, citizen of the United States, residing at Fraser Mills, in the Province of British Columbia, Canada, have invented certain new and useful Improvements in Saw-Carriage Headblock Nuts, of which the following is a specification.

This invention relates to an improvement in the manner of connecting the nut to the head-block knee of a log carriage, whereby the connection can better resist the rough shocks to which knees are subjected when heavy logs are being sawn.

The several knees of a log carriage of this class are simultaneously advanced to or withdrawn from the plane of the saw by a screw rotatably mounted in each bed plate of the saw carriage, which screw passes through a removable nut connected to the head-block.

The several knee screws are simultaneously operated by bevel gears from a shaft, extending along the back of the saw carriage and carried in bearings in the several bed plates, and rotated by any suitable set-works mechanism.

As these nuts have to resist the effort of endwise movement applied through the screw to the knee, chiefly in the direction of moving the log forward to the saw and also the impact of the log rolled against the knee face, the nuts are secured to the knee by screws through an end flange at the after end which flange is integral with the nut. The flange thus receives the thrust of setting up the log to the saw and the shock of a bump when a log is rolled against the knee, and the screws by which it is secured to the head-block receive the strain due to withdrawing the knee from the saw.

In a saw carriage for heavy logs, the screw attachment of the nut to the knees is insufficient to fully resist the strain, and in use the screws are broken or become loose, and with the consequent endwise movement of the nut in its connection to the knee, the integral flange of the nut is frequently broken from it.

It is to remedy these defects that the invention which is the subject of this application has been designed.

The invention is particularly described in the following specification, reference being made to the drawings by which it is accompanied, in which:

Fig. 1 is an end elevation of the saw carriage with a portion of the bed plate removed to show the head-block knee nut and the bearing for its screw.

Fig. 2 is an enlarged longitudinal section of the head-block knee nut and the screw supporting bearing.

Fig. 3 is a cross section of the same on the line 3—3 in Fig. 2 looking in the direction of the arrow.

In these drawings 2 represents one of the transverse girders or bed plates of the log carriage, which girders are supported to extend across the longitudinals 3 of the log carriage and are mounted on the axles 4 of wheels 5 which run on the rails 6 parallel to the plane of the saw blade.

Each knee 7 is endwise slidable on the upper face of its bed plate 2 and engages the edges of the upper flange thereof with retaining strips 8 engaging the underside of the same. The knee 7 is endwise moved on the bed plate 2 by a screw 10 rotatably mounted in the middle line of each bed plate in a bearing 9 at the after end thereof, and rotated by mitre gears 11 from a longitudinal shaft 12 which is carried along the back of the log carriage and supported in a bearing in the after end of each bed plate.

Each screw 11 passes through a nut 13 removably secured to the knee. As usually made a cover plate extends across between the sides of the nut pocket 14 of the knee that the nut may afford support to the forward end of the screw 10.

In the improvement which is the subject of this application, the cover plate is dispensed with and the forward end of the screw is supported in a bearing 15 downwardly projecting from the knee 7 in front of and adjacent the forward end of the nut, and the nut has a collar at each end integral with it, the forward collar 16 fitting between the forward end of the nut support 14, and the backward end of the bearing 15 of the knee.

The nut 13 has, therefore, two faces, instead of only one, to resist backward pressure against the knee, that is, the forward face of the forward collar in contact with the backward face of the bearing 15, and the forward face of the after collar of the nut, against the backward end of the nut pocket, and these collars are both integral with the nut; while in withdrawing the carriage the strain is borne by the integral forward collar of the nut against the forward end of the nut pocket.

The essential features of the invention are the supporting bearing 15 for the forward end of the screw 10, the backward face of which is in contact with the forward collar of the nut 13, and the provision of a nut having a collar at each end, both of which are integral with the nut.

The advantages of the improvement will be obvious to those acquainted with the work of a heavy log carriage for a saw, in the provision of better support in the nut to withstand the forward and backward thrust of the screw whereby the frequent failure of this part of a log carriage is avoided; which breakdowns are the cause of general derangement in the mill organization.

Having now particularly described my invention, I hereby declare that what I claim as new and desire to be protected in by Letters Patent, is:

1. In a saw carriage head-block, the combination with the screw by which the knee is advanced and retired on the bed plate, of a nut for said screw removably fitted between downward projections from the knee to prevent rotation, said nut having an integral collar at each end adapted to engage the ends of the projections from the knee and prevent endwise movement in either direction.

2. In a saw carriage head-block, the combination with the screw by which the knee is advanced and retired on the bed plate, of a nut for said screw removably fitted between downward projections from the knee to prevent rotation of the nut, said nut having an integral collar at each end adapted to engage the ends of the projections from the knee and prevent endwise movement, and a bearing downwardly projecting from the knee and supporting the screw adjacent the nut, the end of said bearing being in contact with the adjacent collar of the nut.

3. In a saw carriage head-block, the combination with the screw by which the knee is advanced and retired on the bed plate, said knee having a downwardly projecting saddle portion with side parallel walls, a nut for said screw removably fitted between said parallel walls and having flat sides to engage the parallel walls of said saddle, said nut having end collars to engage the ends of said saddle and thereby prevent endwise movement of the nut in either direction, and a bearing downwardly projecting from the knee and supporting the screw adjacent the nut, the side of said bearing being in contact with the adjacent collar of the nut.

In testimony whereof I affix my signature.

AARON C. DICKINSON.